United States Patent [19]

Miller

[11] 3,842,866

[45] Oct. 22, 1974

[54] PLASTIC WELDED TUBE

[75] Inventor: Norman K. Miller, Concordville, Pa.

[73] Assignee: Miller Brothers, Concordville, Pa.

[22] Filed: June 11, 1973

[21] Appl. No.: 368,747

[52] U.S. Cl. ............................................. 138/128
[51] Int. Cl. ............................................. F16l 11/06
[58] Field of Search ............ 138/128, 171; 156/203, 156/466; 53/8, 28

[56] References Cited
UNITED STATES PATENTS

| | | | |
|---|---|---|---|
| 2,384,462 | 9/1945 | Goodman | 138/128 X |
| 3,312,250 | 4/1967 | Sirignano et al. | 138/128 |
| 3,661,322 | 5/1972 | Norman | 53/28 X |

*Primary Examiner*—Jerry W. Myracle

[57] ABSTRACT

In the manufacture of a welded polypropylene container, a quantity of vinyl material is interposed between layers of polypropylene to be united, and the polypropylene layers are both welded to the interposed vinyl.

5 Claims, 4 Drawing Figures

PATENTED OCT 22 1974 3,842,866

PLASTIC WELDED TUBE

BACKGROUND OF THE INVENTION

As is well known to those versed in the plastic and packaging arts, polypropylene plastic affords very substantial advantages by reason of its strength and low cost. However, in the past substantial obstacles have existed to wide spread use of polypropylene sheeting in the packaging field. For example, the securement or welding together of polypropylene presents problems in that the material tends to crystallize and otherwise degenerate under welding heat, so that welding of polypropylene to itself was considered unreliable and otherwise unsatisfactory.

SUMMARY OF THE INVENTION

Accordingly, it is an important object of the present invention to provide a polypropylene container construction and method of welding which overcomes the above-mentioned difficulties, is capable of relatively high speed continuous performance for mass production economies, produces an extremely strong and highly reliable weld which is at least as strong as the original material, and wherein any desired polypropylene sheeting may be employed, including woven sheeting, film sheeting and felted or nonwoven sheeting.

It is still a further object of the present invention to provide a unique container construction having the advantageous characteristics mentioned in the preceding paragraph, wherein polypropylene sheeting is united or secured by welding to an interposed quantity of vinyl, to achieve a quick, economical, safe and entirely reliable weld.

Other objects of the present invention will become apparent upon reading the following specification and referring to the accompanying drawings, which form a material part of this disclosure.

The invention accordingly consists in the features of construction, combinations and arrangements of parts and method steps, which will be exemplified in the following description, and of which the scope will be indicated by the appended claims.

DESCRIPTION OF THE PREFERRED EMBODIMENT

Figure 1:
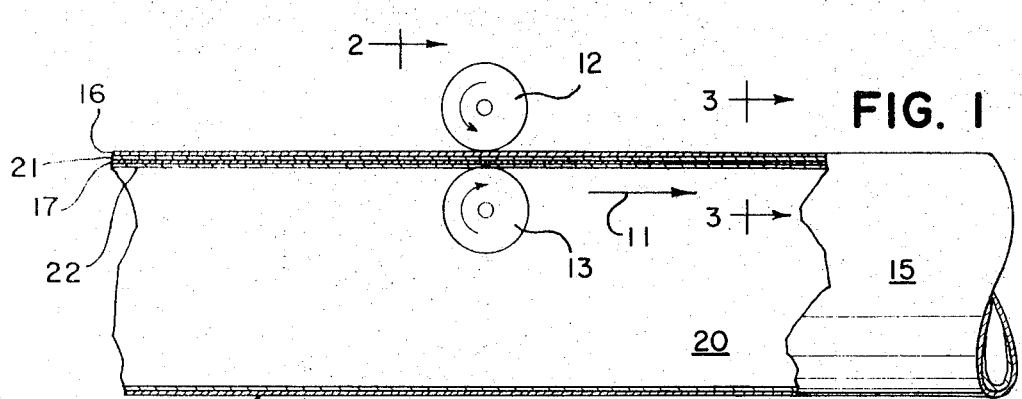
FIG. 1 is a longitudinal sectional view illustrating the method of welding in accordance with the teachings of the present invention.
Figure 2:
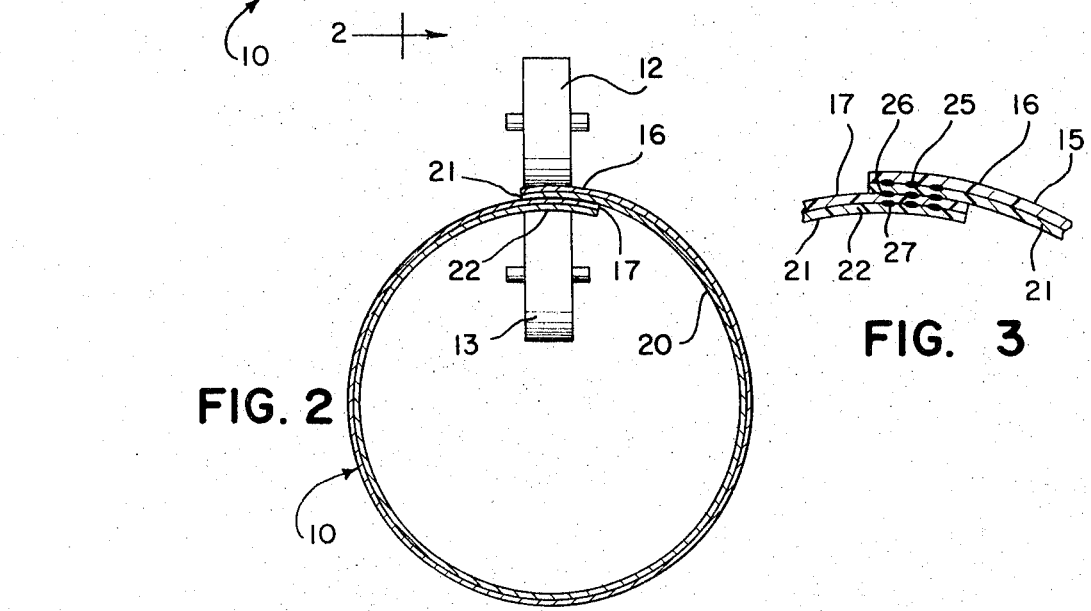
FIG. 2 is a transverse sectional view taken generally along the line 2—2 of FIG. 1.

Referring now more particularly to the drawings, and specifically to FIGS. 1 and 2 thereof, an elongate tubular formation is there generally designated 10, and moves longitudinally, say in the direction of arrow 11, while being operated upon by a pair of welding rollers 12 and 13.

The tubular formation 10 may include an elongate web or sheet 15 having its longitudinal margins or edge portions 16 and 17 located in longitudinally extending facing relation with respect to each other. Thus, the sheet 15 is curved into a tubular configuration with its marginal edge portions in facing relation. The material of web or sheet 15 is polypropylene plastic, and may assume any conventional form, such as woven, film, felted, nonwoven, et cetera.

Generally coextensive with the polypropylene sheet 15 is a vinyl sheet 20, having its longitudinal edge regions or marginal portions 21 and 22 also in longitudinally extending facing relation with each other. Further, one edge margin 21 of the vinyl sheet 20 is interposed in sandwiched relation between the polypropylene sheet portions 16 and 17, and defines a quantity of vinyl between the facing portions 16 and 17, for purposes appearing presently. In addition, the vinyl sheet edge region or marginal portion 22 is located interiorly of the tubular formation and combines with the vinyl portion 21 to sandwich therebetween the intermediate polypropylene sheet portion 17. The vinyl sheeting 20 is advantageously of film, but may be of other suitable sheet type.

The overlying plastic sheet portions 16, 21, 17 and 22 pass longitudinally through a welding station, such as between the nip of welding rolls 12 and 13. The weld may advantageously be accomplished by passing high frequency radiation between the rolls and through the plastic layers 16, 21, 17 and 22, although the use of heat may also effect a satisfactory weld.

Figure 3:
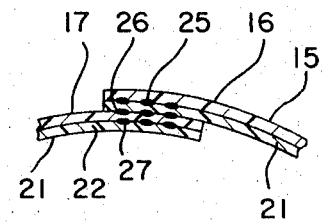
FIG. 3 is a partial transverse sectional view taken generally along the line 3—3 of FIG. 1.
Figure 4:
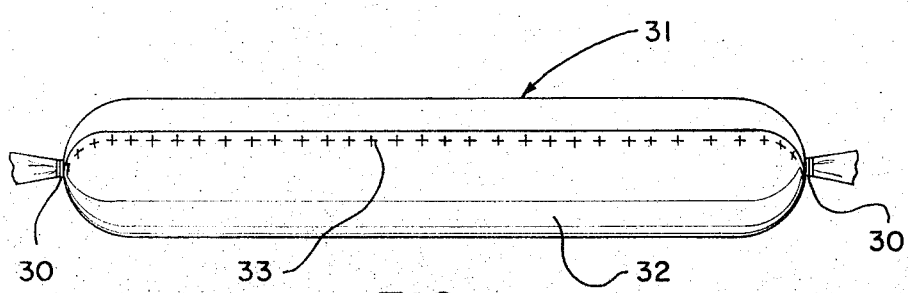
FIG. 4 is an elevational view showing a container of the present invention.

As best seen in FIG. 3, the upper or outer polypropylene portion 16 is welded, as at 25 to the next adjacent vinyl portion 21, and the latter is welded, as at 26 to the inner polypropylene portion 17. Further, the interior vinyl portion 22 of vinyl sheet 20 is welded, as at 27, to the inner polypropylene portion 17. It will therefore be appreciated that a tubular configuration is formed by the welding procedure, and that a liquid and hermetic seal is provided by the weld 25, 26 and 27. Of course, a continuous, indefinite length of tubular configuration may be produced by the above-described welding procedure, which configuration is advantageously severed into desired lengths of tubing. The length of tubing may be filled with suitable contents, having their ends sealed in any suitable manner, as by clinch rings 30, see FIG. 4, to define a tubular, sealed container 31. Thus, it will be appreciated that the container 31 includes a tubular plastic body 32 having a longitudinal weld 33 and closed ends to define an effectively sealed container. Of course, other forms of end closures may be employed, as desired, including welding in accordance with the teachings of the instant invention. The weld itself is constituted of a plurality of welds, namely weld 25 between polypropylene 15 and vinyl 21, and weld 26 between vinyl 21 and polypropylene 17. If desired, the inner vinyl layer 22 may be welded to the inner polypropylene layer 17, as by weld 27.

From the foregoing it will now be understood that the instant invention provides a method of welding polypropylene, and a polypropylene container, which permits of utilizing the relatively high strength and cost advantages of polypropylene, while affording a high speed mass production method of manufacture, to result in a strong, durable and flexible container, which container and welding method are well adapted to achieve their intended objects.

Although the present invention has been described in some detail by way of illustration and example for purposes of clarity of understanding, it is understood that certain changes and modifications may be made within the spirit of the invention.

What is claimed is:

1. In a polypropylene container, the improvement comprising a pair of polypropylene sheet portions in facing relation, and a quantity of vinyl interposed between and welded to said sheet portions.

2. A polypropylene container according to claim 1, the polypropylene sheet portions comprising a single sheet having spaced region in facing relation defining said portions.

3. A polypropylene container according to claim 2, said vinyl being sheeting sandwiched between said portions.

4. A polypropylene container according to claim 3, said vinyl sheeting being generally coextensive with said polypropylene sheet and having facing vinyl sheeting regions secured in sandwiching relation with one of said polypropylene sheet portions.

5. A polypropylene container according to claim 3, said single polypropylene sheet and vinyl sheeting defining a tube.

* * * * *